United States Patent
Kramarczyk et al.

(10) Patent No.: US 6,712,348 B1
(45) Date of Patent: Mar. 30, 2004

(54) ADAPTER FOR AGILE FIXTURING AUTOMATION

(75) Inventors: Mark A. Kramarczyk, Westland, MI (US); Gary Lee Jones, Farmington Hills, MI (US); Andrew Leslie Bartos, Clarkston, MI (US); Yhu-Tin Lin, Rochester Hills, MI (US); Phillip A. Bojda, Macomb, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/392,295

(22) Filed: Mar. 18, 2003

Related U.S. Application Data

(60) Provisional application No. 60/413,188, filed on Sep. 24, 2002.

(51) Int. Cl.[7] .................................................. B25B 1/00
(52) U.S. Cl. ........................ 269/329; 269/71; 269/24; 269/27
(58) Field of Search .............................. 483/14, 15, 59; 269/24, 329, 32, 71, 900, 45, 8, 27; 29/35.5, 48.5 A

(56) References Cited

U.S. PATENT DOCUMENTS

| | | | |
|---|---|---|---|
| 4,604,787 A | * | 8/1986 | Silvers, Jr. .................. 483/55 |
| 5,131,706 A | * | 7/1992 | Appleberry .............. 294/119.1 |
| 6,644,637 B1 | * | 11/2003 | Shen et al. .................. 269/152 |

* cited by examiner

*Primary Examiner*—Robert C. Watson
(74) *Attorney, Agent, or Firm*—Kathryn A. Marra

(57) ABSTRACT

An adapter for picking up and placing a fixture element on a fixture body using a controlled tool handling device having a tool translating and rotating spindle. The spindle has a tool receiving end and an axis of rotation. The adapter receives a cylindrical post member of a fixture element on a fixture body. The adapter has a first end having a receptacle for receiving the end of the spindle. The second end of the adapter is displaced from the first end and includes a cylindrical socket formed on the end. The socket is co-axial with the spindle and receives the cylindrical post member of the fixture element. A fluid passage is formed in the adapter from the receptacle to the cylindrical socket. The cylindrical socket has an upstream end and a down stream end. A piston is disposed in the upstream end of the socket. The piston is moveable longitudinally within the socket in response to fluid pressure delivered from the spindle through the fluid passage. The downstream end of the socket has a circumference with radially inwardly protruding bayonet pins for engaging a circumferential groove of the cylindrical post member.

17 Claims, 3 Drawing Sheets

ADAPTER FOR AGILE FIXTURING AUTOMATION

This application claims priority to U.S. Provisional Application No. 60/413,188 filed Sep. 24, 2002.

TECHNICAL FIELD

This invention pertains to adapters. More specifically, this invention relates to adapters for retaining and moving fixture elements associated with a work fixture.

BACKGROUND OF THE INVENTION

There is a need in manufacturing operations for durable and reconfigurable workholding fixtures especially for flexible manufacturing operations. The fixtures must be readily and accurately adaptable to hold different workpiece shapes for machining applications or the like. Sometimes the workpieces are similar or related part shapes such as cast aluminum cylinder heads for different engines. In other manufacturing situations the parts may be of unrelated design but requiring similar manufacturing operations. In these varied applications, the fixture reconfiguration or changeover from one part design to another has to be fast enough to meet the productivity requirements of current manufacturing systems.

One innovative fixture utilizes the portability of a flat, very powerful electro-permanent magnetic chuck to provide freedom in position maneuverability and autonomous hydraulic modular elements to provide the automated part support or clamp functions. Such a fixture and modular elements are described in patent application Ser. No. 10/243,860 now U.S. Pat. No. 6,644,637 which is commonly owned by the assignee of the present invention and is herein incorporated by reference. Each autonomous integrated modular clamping or supporting element consists of a hydraulic screw pump, a hydraulic cylinder, such as a typical swing clamp cylinder or a compliant member extended work support cylinder, and a steel base plate. The steel base plate provides a channel for hydraulic fluid flow between the hydraulic screw pump and hydraulic cylinder. The base is made of ferromagnetic material so that it is strongly attracted to a magnetized fixture plate. A NC program can command a simple nut-runner to torque the screw pump to actuate the hydraulic swing clamp or support. By packaging the hydraulic power source alongside with the clamp or support, there is no longer a constraint by any rigid and fixed hydraulic feed lines. The mounting surface area of the base plate has been optimized so that there will be enough magnetic flux to create a sufficiently strong magnetic holding force to secure the modular base plate to the chuck. Moreover, the bottom face of the base plate has a specially prepared surface texture and roughness to further increase the sliding resistance to any slippage between the base plate and the magnetic chuck during machining.

Such a fixture system has the ability to reconfigure a part holding fixture quickly and automatically at a special fixture setup station. The fixture setup station is fashioned similar to a state-of-the-art multi-axis machining center. A "fixture element" storage magazine and a "fixture element" changer could replace the traditional cutting tool storage magazine and the automatic cutting tool changer. The choice of the multi-axis machining center is because of its higher positioning accuracy capability over a robotic system. The end of the machine spindle nose requires a specially designed adapter so that a modular fixture element can be swiftly attached to or released from it. It is an object of this invention to provide such an adapter.

SUMMARY OF THE INVENTION

This invention provides an adapter permitting the use of a numerically controlled machine in placing fixture elements on the magnetizible fixture plate described above. The structure of the adapter is described in a following paragraph.

Once such an adapter is provided and in a fixture setup station, the magnetic chuck is brought to the station table, hooked up to a power source, and energized at a reduced magnetization level. A modular fixture element, locating, clamping, or supporting as dictated by the specific part fixture arrangement is gripped; by the fixture element changer from the storage magazine and attached to the spindle nose adapter provided by this invention. The X- and Y- drives of the fixture setup station will move simultaneously so that a precise coordinate position on the flat magnetic chuck is aligned. The fixture element is then brought very close to the surface of the magnetic chuck by the motion of the spindle Z-axis. Once the distance between the fixture element base plate and the magnetic chuck has reached a pre-determined value, the fixture element is released by the spindle nose adapter and automatically attaches itself gently to the magnetic chuck surface by the magnetic attractive force. The pre-selected reduced magnetization level is to ensure the fixture element will not be slamming violently onto the chuck. The fixture setup NC program then initiates the next round of commands to setup the second fixture element, the third element, and so on. After all the modular fixture elements are set up accurately in their respective positions, the magnetic chuck is fully energized so as to hold the modular elements with the designed maximum holding power. The part will be laid on the fixture by an overhead gantry loader or other material handling equipment. The spindle nose adapter will pick up a nut-runner adapter (with a built-in torque limiter) from the storage magazine and actuate the screw pumps in the various supporting and clamping elements in a prescribed sequence. Finally, the magnetic chuck together with its fixture elements and the clamped part is transferred to a designated machining station for processing.

In accordance with a preferred embodiment of this invention an adapter is secured to a rotatable and translatable spindle of a numerically controlled machine tool. The spindle has a tool receiving end and an axis of rotation. The adapter receives a cylindrical post member (such as a screw pump post) of a fixture element for placement on a fixture body. The adapter has a first end having a receptacle for receiving the end of the spindle. The second end of the adapter has a cylindrical socket and is displaced on a longitudinal axis from the first end. The socket is co-axial with the receptacle as well as the spindle that is inserted in the receptacle and sized and shaped to receive the cylindrical post member of a fixture element. A fluid passage is formed in the adapter from the spindle receptacle to the cylindrical socket. The cylindrical socket has an upstream end and a down stream end. A piston is disposed in the upstream end of the socket. The piston is moveable longitudinally within the socket in response to fluid pressure delivered from the spindle through the fluid passage and against the piston. The downstream end of the socket has a circumference with radially inwardly protruding bayonet pins for engaging a circumferential groove provided for such engagement on the cylindrical post member. In a fixture element placing operation, a cylindrical post is inserted into the downstream end of the socket and into engagement with the bayonet pins. The spindle rotates the adapter to lock the pins into detents in the groove. Fluid pressure is then applied to the piston moving it into contact with the cylindrical post member to secure the fixture element for lifting and placing by the NC machine.

The numerically controlled machine is actuated to move its spindle, the adapter and fixture element to place the element on a fixture plate as described above. When the fixture element has been magnetically secured to the plate, the fluid pressure is released and piston no longer is pressed on the top of the screw pump post. The spindle is turned to remove the bayonet pins from the detents and groove on the screw pump surface. The spindle is then lifted from the fixture element carrying with it the adapter and completing one such placing operation.

In a preferred embodiment of the invention, the adapter comprises a compliant member, such as a spring, in a chamber located between the spindle receptacle and the piston portion of the socket member. A purpose of the compliant member is to provide a cushion between the NC machine and its spindle and the fixture member and plate in the event there is an impediment not permitting normal placement of the fixture piece.

Other objects and advantages of the invention will be understood from a description of preferred embodiments. Reference will be made to drawing figures that are described in the following section.

BRIEF DESCRIPTION OF THE DRAWINGS

FIG. 4 is a cut-away isometric view detailing the bayonet pins within the groove of the fixture element and rotating to align with detents formed in the groove of the fixture element;

DETAILED DESCRIPTION OF THE PREFERRED EMBODIMENT

Figure 1:
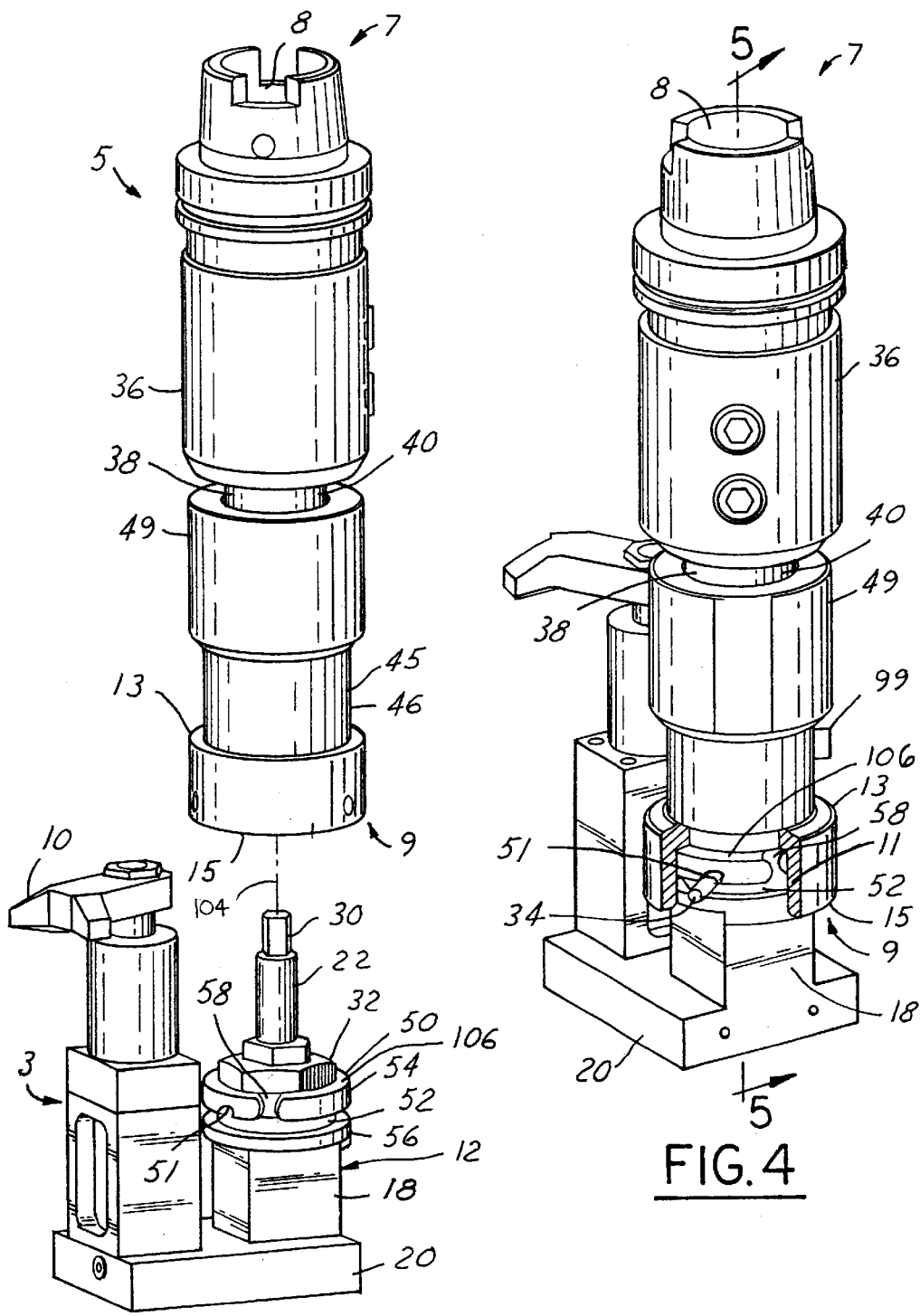
FIG. 1 is a side view of an adapter of the present invention located over a fixture element. The NC machine and spindle are not shown.

The practice of the invention will be illustrated by describing an adapter 5 for securing to the spindle of an NC machine and used to place a fixture element 3 on a fixture plate (not shown) as part of a fixture assembly for machining a cast work-piece.

In order to facilitate such machining, a part must be securely held in a fixture so that numerically controlled machine tools can accurately remove metal from the casting to arrive at its specified finish dimensions. A reconfigurable, magnetic fixture, as described above is preferably utilized to support and hold the part.

An illustrative modular fixture element 3 for use in conjunction with the adapter of the present invention is shown in FIGS. 1–5. Fixture element 3 comprises a hydraulically actuated and lockable clamping cylinder and arm 10 of a known type. The fixture element 3 also contains a hydraulic screw pump 12 of a known type. Hydraulic clamping arm devices suitable for use in the practice of this invention are commercially available. Various commercial clamps are available depending upon the height required for clamp 10 and different clamp arm shapes are available. In the described fixture element 3, hydraulic clamp 10 is used in combination with a hydraulic screw pump 12. Such pumps are also commercially available.

Figure 2:
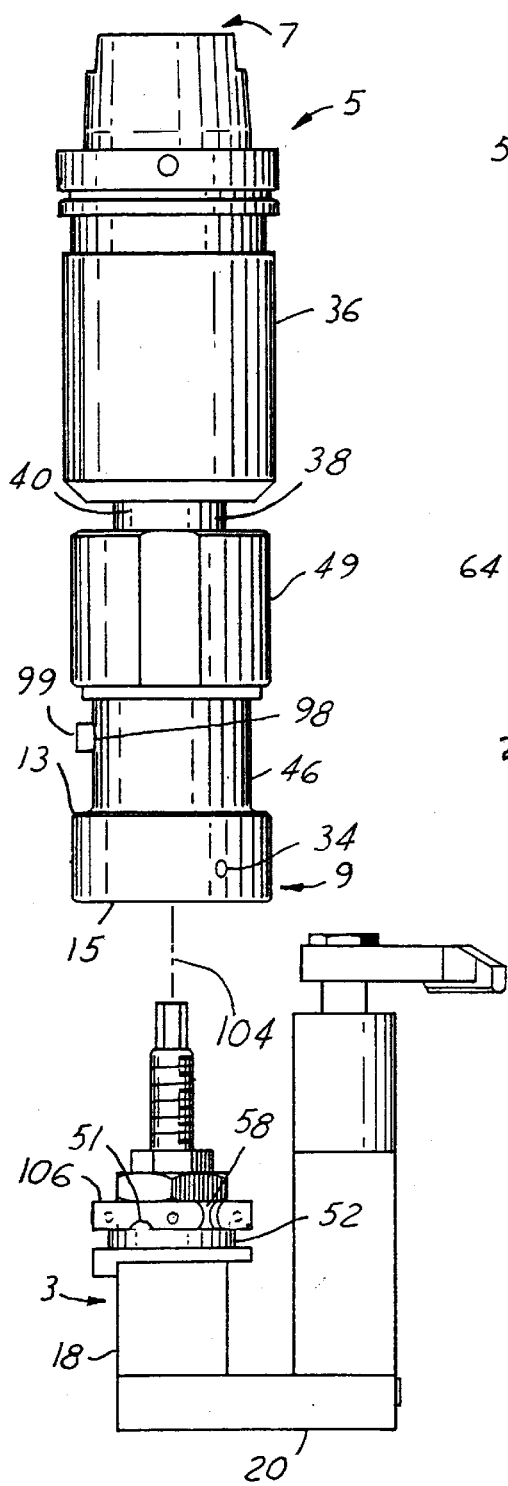
FIG. 2 is another side view of the adapter and fixture element in which the adapter is aligned with an axis of the groove of the fixture element.

As can be seen in FIG. 1, the hydraulic screw pump 12 is inserted upright into an elevated portion 18 of a base 20. Screw pump 12 contains a cylindrical post member 22 with helical threads (not shown in FIG. 1 but shown in FIGS. 2, 3 and 5) along the central portion of its length. One end of the cylindrical post member 22 is inserted in threaded engagement into a hydraulic cylinder formed in the elevated portion 18 of the base 20. The upper end 30 of the cylindrical post member 22 is a hexagonal nut for manual or robotic actuation of the pump 12. Below the hexagonal nut is a connecting portion 50 of the base 20. Connecting portion 50 is designed to be securely received by the adapter 5. The connecting portion 50 includes a circumferential groove 52. The groove 52 is formed between first and second flanges 54, and 56 respectively. The first flange 54 includes vertical slots 58 formed through the flange 54 and intersecting the groove 52. The slots 58 are positioned around the circumference of the connecting portion 50 at positions corresponding to bayonet pins 34 of the adapter 5, which will be discussed in more detail below. The groove 52 also includes detents 51 that engage the bayonet pins 34, as shown in FIGS. 1, 2 and 4 when the adapter 5 retains the fixture element 3.

The adapter 5 of the present invention is a double ended shaft-like tool for connecting a spindle to a fixture element 3. The adapter 5 comprises a first end 7 having a round, hollow receptacle 8 for receiving the end of a spindle (not shown) of a numerically controlled machine (not shown). The second end 9 is displaced length-wise from the first end 7. The second end 9 comprises a cylindrical socket 11, co-axial with the receptacle 8 and inserted spindle, for receiving and holding the cylindrical post member 22 of the fixture element 3. A fluid passage 42 is formed centrally along a length of the adapter 5 extending from the receptacle 8 of the first end 7 to the hollow, round socket 11 of the second end 9.

The cylindrical socket 11 includes an upstream end 13 and a downstream end 15. A hollow piston 44 is disposed within the upstream end 13 of the socket 11 and is moveable longitudinally within the socket 11 in response to fluid pressure delivered from the spindle of the numerically controlled machine through the fluid passage 42. The downstream end 15 of the socket 11 is enlarged to receive flanges 54, 56 of connecting portion 50 of the screw pump 12 and includes radially inwardly protruding bayonet pins 34 disposed about the circumference of the socket 11 for engaging the circumferential groove 52 of the connecting portion 50.

In a preferred aspect, the receptacle 8 is a double ended piece comprising a second hollow receptacle member 36 which is connected to a first portion 38 of hollow cylindrical member 40 that is fixed relative to the spindle of the machine. The hollow cylindrical member 40 has a shaft adapted to engage the receptacle member 36. The hollow cylindrical member 40 preferably includes a fluid passage 42 formed through the fixed cylinder's center extending along its axis to allow for fluid pressure to be delivered to the piston 44, which will be discussed in more detail below.

A second portion 45 is connected to the first portion 38 and comprises a cylindrical element 46 adapted to engage an inner diameter of the hollow cylindrical member 40. The hollow cylindrical member 40 and cylindrical element 46 cooperate to define a chamber 47. A compliant member 48 is disposed in the chamber 47 to allow for longitudinal movement of the first portion 38 relative to the second portion 45 in the event of a crash condition, which will be discussed in more detail below.

A retaining collar 49 engages an outer diameter of the cylindrical element 46 at a first end 200 and a flange 68 formed on the hollow cylindrical member 40 at a second end 64 to connect the cylindrical element 46 and hollow cylindrical member 40. The length of the retaining collar 49 can be varied to adjustably preload a force and displacement of the compliant member 48, such that the movement of the first portion 38 of the adapter relative to the second portion 45 during a crash condition can be varied. A crash condition is defined as a condition where the adapter 5 fails to engage and retain a fixture element 3. A pin 75 is disposed in a hole 88 formed in the cylindrical element 46 and engages a notch 89 formed in the flange 68 of hollow cylindrical member 40. The pin 75 prevents rotation of the cylindrical element 46 with respect to the hollow cylindrical member 40.

Figure 3:
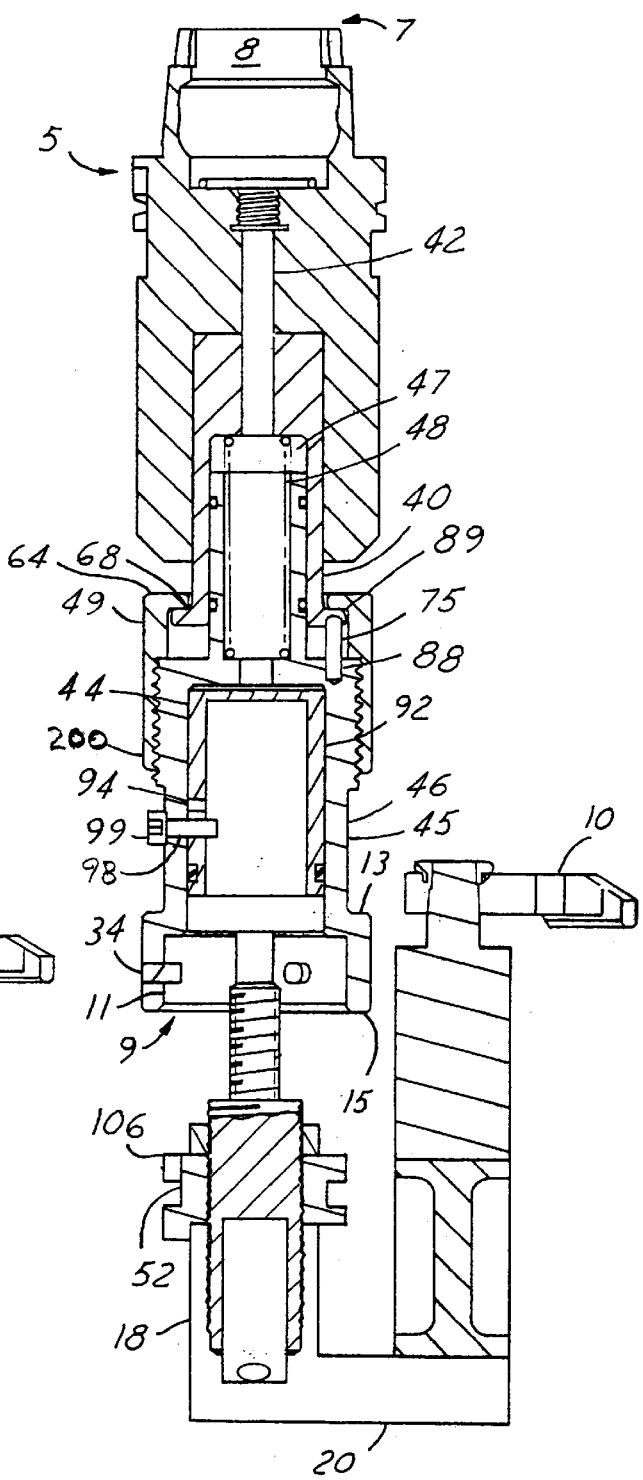
FIG. 3 is a side sectional view of the adapter and fixture element in which the bayonet pins engage the slots formed in the groove of the fixture element.
Figure 5:
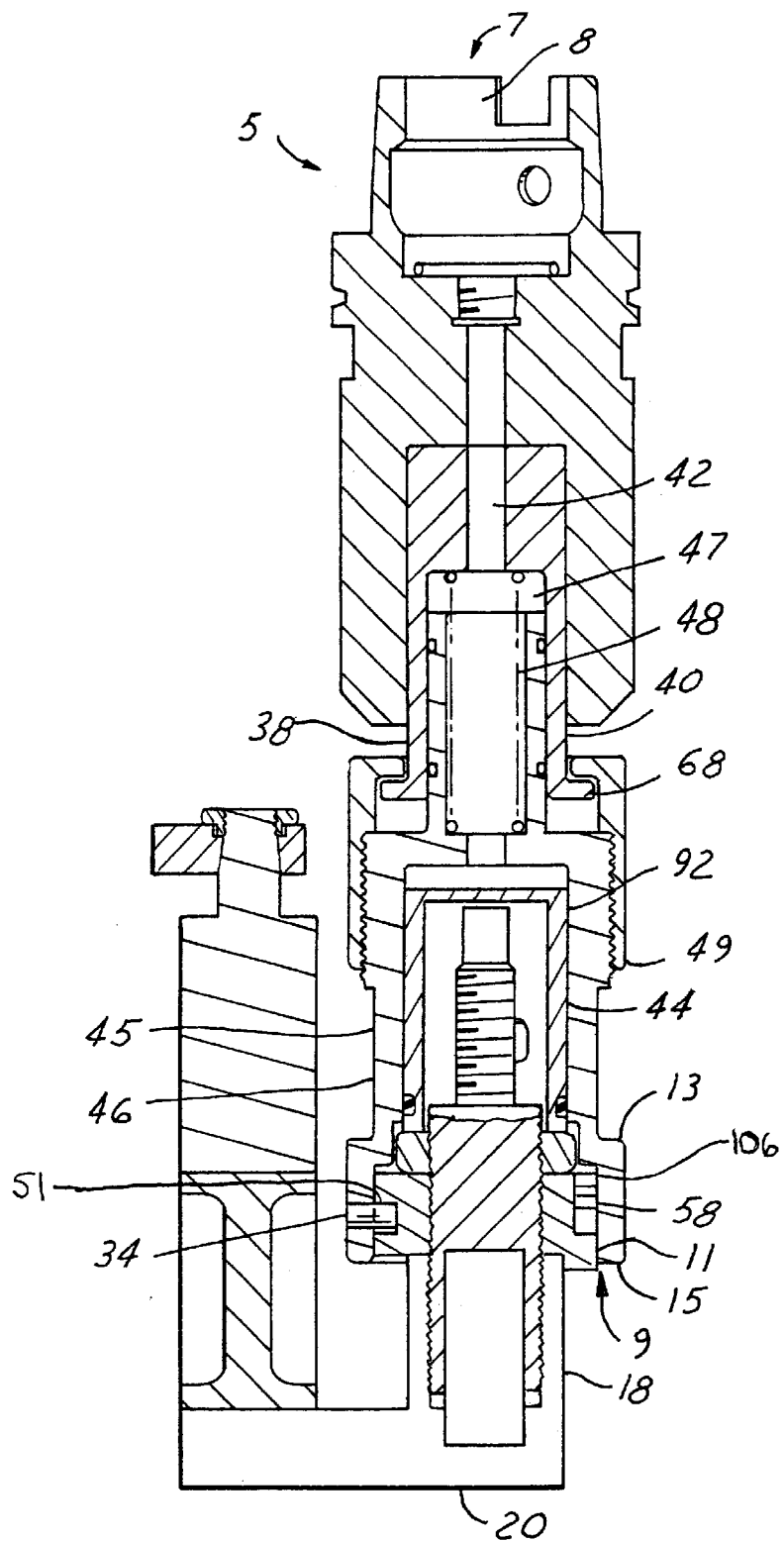
FIG. 5 is a side sectional view of the adapter and fixture element in which the locking piston engages the post of the fixture element and the adapter has been rotated thereby-moving the bayonet pins into-the detents to securely retain the fixture element within the adapter.

The piston 44, as referenced above, is disposed within the socket 11 and further extends into a bore 92 formed in the cylindrical element 46, as best seen in FIGS. 3 and 5. The piston 44 is moveable longitudinally within the bore 92 in response to a delivered fluid pressure. The piston 44 includes an oval slot 94 formed therein. A screw 99 disposed in a circumferential bore 98 formed in the cylindrical element 46 engages the slot 94 to prevent the piston 44 from moving beyond a boundary of the bore 92.

Bayonet pins 34 are disposed in a plurality of circumferential bores 35 formed in the cylindrical element 46. The bayonet pins 34 engage corresponding slots 58 formed on the fixture element 3, as discussed above.

In use, the adapter 5 is stored in a NC machine's tool magazine, or similar location, during normal machining operations. When needed for a changeover, the adapter 5 is selected and installed in the robot or NC spindle, as a conventional tool would be. The adapter 5 is then lined up with the axis 104 of the mating groove 52 (see FIG. 2) and advanced along this axis 104 so that the bayonet pins 34 engage the slots 58 (see FIG. 3). The adapter 5 continues to advance until it is able to rotate the bayonet pins 34 into the groove 52 of the fixture element 3 (see FIG. 4). The adapter 5 rotates until the bayonet pins 34 align with the detents 51. At this point pressurized fluid from the NC machine (not shown) travels through the fluid passage 42 into the chamber 47 to force the piston 44 down against the upper face 106 of the fixture element 3. At this moment, the adapter 5 retracts, moving the bayonet pins 34 into the detents 51 and lifting the fixture element 3 free of a fixture (not shown). The fixture element 3 is now firmly grasped and can be relocated as desired (see FIG. 5). In a preferred aspect of the invention, the slots 58 are placed equally around the circumference of the adapter 5. This arrangement allows the spindle of the NC machine to rotate in the same direction to engage and disengage the adapter 5 thereby simplifying operation of the NC machine.

In the event that the adapter is prevented from reaching its full advancement, either due to misalignment or contamination of the mating surfaces, then a crash condition exists. In such a situation the first portion 38 of the adapter 5 compresses (see FIG. 5) the compliant member 48 trapped in the chamber 47 as the cylindrical element 46 slides into the hollow cylindrical member 40.

While the invention has been described in terms of certain preferred embodiments it is apparent that other embodiments could readily be devised by one skilled in the art. The scope of the invention is to be considered limited only by the following claims.

What is claimed is:

1. A double-ended adapter tool for use with a numerically controlled machine tool having a rotatable and translatable spindle to locate a fixture element on a fixture body said spindle having a tool receiving end and an axis of rotation, and said fixture element having a cylindrical post member, said cylindrical post member having a circumferential groove, said adapter tool comprising:

a first end having a receptacle member with a receptacle for fixedly receiving said tool receiving end of said spindle, said receptacle member having a longitudinal axis coincident with said axis of rotation of an inserted spindle;

a second end, displaced from said first end, said second end comprising a cylindrical socket, centered on said axis of rotation of said receptacle, for receiving and holding said cylindrical post member of said fixture element;

a fluid passage from said receptacle to said cylindrical socket;

said cylindrical socket having an upstream end and a down stream end, said socket having a piston disposed in the upstream end of said socket, the piston being moveable longitudinally within the socket in response to fluid pressure delivered from said spindle through said fluid passage, and the downstream end of said socket having an internal circumference with radially inwardly protruding bayonet pins for engaging said circumferential groove;

whereby in the operation of said adapter tool, said cylindrical post is received into said downstream end of said socket into engagement with said bayonet pins and fluid pressure applied to said piston moves it into contact with said cylindrical post member to secure said fixture element.

2. The adapter tool of claim 1 comprising a screw for retaining said piston against movement beyond a boundary of said socket.

3. The adapter tool of claim 1 wherein the bayonet pins are disposed equidistant around a circumference of said socket.

4. The adapter tool of claim 1 wherein the cylindrical post member further includes slots formed around the circumference corresponding to positions of the bayonet pins of the adapter tool.

5. The adapter tool of claim 4 wherein the slots intersect the groove and allow the bayonet pins to enter the groove, wherein spindle rotation of the adapter tool moves the bayonet pins until juxtaposed with detents formed in the groove.

6. The adapter tool of claim 5 wherein the locking piston actuates in response to the delivered fluid pressure moving the piston into contact with said cylindrical post member whereby the bayonet pins move into the detents for securely retaining the fixture element.

7. A double-ended adapter tool for use with a numerically controlled machine tool having a rotatable and translatable spindle to locate a fixture element on a fixture body, said spindle having a tool receiving end and an axis of rotation, and said fixture element having a cylindrical post member, said cylindrical post member having a circumferential groove, said adapter tool comprising:

a first end having a receptacle member with a receptacle for fixedly receiving said tool receiving end of said spindle, said receptacle member having a longitudinal axis coincident with said axis of rotation of an inserted spindle;

a second end, displaced from said first end, said second end comprising a cylindrical socket, centered on said axis of rotation of said receptacle, for receiving and holding said cylindrical post member of said fixture element;

a fluid passage from said receptacle to said cylindrical socket;

said cylindrical socket having an upstream end and a down stream end, said socket having a piston disposed in the upstream end of said socket, the piston being moveable longitudinally within the socket in response to fluid pressure delivered from said spindle through said fluid passage, and the downstream end of said socket having an internal circumference with radially inwardly protruding bayonet pins for engaging said circumferential groove;

whereby in the operation of said adapter tool, said cylindrical post is received into said downstream end of said socket into engagement with said bayonet pins and fluid pressure applied to said piston moves it into contact with said cylindrical post member to secure said fixture element;

said receptacle member further comprising a chamber opening axially opposite said receptacle, said chamber having a hollow cylindrical member opening terminating in a shaft for sliding telescopic engagement with said socket member, said shaft having a terminal flange, said socket member comprising a cylindrical element adapted for telescopic engagement with said shaft.

8. The adapter tool of claim 7 comprising a retaining collar, which is attached in a removable manner to said socket member and engaging said terminal flange.

9. The adapter tool of claim 7 comprising a screw for retaining said piston against movement beyond a boundary of said socket.

10. The adapter tool of claim 7 wherein the bayonet pins are disposed equidistant around a circumference of said socket.

11. The adapter tool of claim 7 wherein the cylindrical post member further includes slots formed around the circumference corresponding to positions of the bayonet pins of the adapter tool.

12. The adapter tool of claim 11 wherein the slots intersect the groove and allow the bayonet pins to enter the groove, wherein spindle rotation of the adapter tool moves the bayonet pins until juxtaposed with detents formed in the groove.

13. The adapter tool of claim 12 wherein the locking piston actuates in response to the delivered fluid pressure moving the piston into contact with said cylindrical post member whereby the bayonet pins move into the detents for securely retaining the fixture element.

14. The adapter tool of claim 7 further including an anti-rotation pin disposed between said socket member and said terminal flange.

15. The adapter tool of claim 7 wherein said chamber includes a compliant member disposed therein.

16. The adapter tool of claim 15 wherein the compliant member is compressed within the chamber for preventing damage to the adapter tool in response to a crash condition wherein said socket member is driven into said hollow cylindrical member.

17. The adapter tool of claim 15 wherein the retaining collar has a variable length to adjustably preload a force and displacement of the compliant member.

* * * * *